(12) United States Patent
Ikeda et al.

(10) Patent No.: US 8,192,035 B2
(45) Date of Patent: Jun. 5, 2012

(54) PROJECTION DISPLAY APPARATUS

(75) Inventors: Takashi Ikeda, Higashi Osaka (JP); Takahisa Ando, Ikoma (JP); Kiyoko Tsuji, Daito (JP); Yusuke Itoh, Toyonaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 203 days.

(21) Appl. No.: 12/725,643

(22) Filed: Mar. 17, 2010

(65) Prior Publication Data
US 2010/0245787 A1    Sep. 30, 2010

(30) Foreign Application Priority Data
Mar. 26, 2009    (JP) .................... 2009-077044

(51) Int. Cl.
*G03B 21/14*    (2006.01)
(52) U.S. Cl. .......................... 353/119; 353/79

(58) Field of Classification Search ............ 353/79, 353/76, 119, 63, 65, 66, 70, 71, 98
See application file for complete search history.

(56) References Cited

U.S. PATENT DOCUMENTS

| | | | |
|---|---|---|---|
| 6,527,397 B2* | 3/2003 | Furuichi et al. | 353/119 |
| 7,470,030 B2* | 12/2008 | Devos et al. | 353/74 |
| 8,002,419 B2* | 8/2011 | Amano et al. | 353/98 |
| 8,096,664 B2* | 1/2012 | Yazaki | 353/119 |
| 2010/0165308 A1* | 7/2010 | Morikuni et al. | 353/98 |

FOREIGN PATENT DOCUMENTS
JP    2007-334052 A    12/2007
* cited by examiner

*Primary Examiner* — William C Dowling
(74) *Attorney, Agent, or Firm* — Marvin A. Motsenbacker

(57) ABSTRACT

A projection display apparatus includes a housing case housing a light source unit, a light valve, a projection unit, and a cooling unit. A size of the housing case in an orthogonal direction to a projection plane is smaller than a size of the housing case in a horizontal direction parallel to the projection plane. The projection unit is arranged at substantially center of the housing case in the horizontal direction parallel to the projection plane.

3 Claims, 10 Drawing Sheets

PROJECTION-PLANE SIDE • FRONT SIDE

DEPTH DIRECTION

FIG. 10

WIDTH DIRECTION

PROJECTION DISPLAY APPARATUS

CROSS REFERENCE TO RELATED APPLICATIONS

This application is based upon and claims the benefit of priority from prior Japanese Patent Application No. 2009-077044, filed on Mar. 26, 2009; the entire contents of which are incorporated herein by reference.

BACKGROUND OF THE INVENTION

1. Field of the Invention

The present invention relates to a projection display apparatus which includes; a solid light sources; a light valve configured to modulate light emitted from the solid light sources; and a projection unit configured to project light emitted from the light valve on a projection plane.

2. Description of the Related Art

Recently, there has been known a projection display apparatus including a solid light source such as a laser light source, a light valve configured to modulate light emitted from the solid light source, and a projection unit configured to project the light outputted from the light valve on a projection plane.

Here, a long distance between the projection unit and the projection plane needs to be assured for displaying a large-size image on the projection plane. To address this, a projection display system has been proposed which aims to shorten the distance between the projection unit and the projection plane by using a reflection mirror configured to reflect the light, outputted from the projection unit, toward the projection plane for example, Japanese Patent Application Publication No. 2007-334052).

When the projection display apparatus is of a wall projection type, a ceiling plate of the housing case has a transmission area through which light reflected by a reflection mirror passes toward (is projected on) the projection plane. The transmission area may be an opening or may be formed of a transmissive member.

When a laser light source is used as the solid light source, it is desirable that light having been emitted from the solid light source and having passed through the transmission area should be guided only toward the projection plane.

SUMMARY OF THE INVENTION

A projection display apparatus of first aspect includes a housing case (housing case 200) housing a solid light source (red solid light sources 111R, green solid light sources 111G, blue solid light sources 111B), a light valve (DMD 500R, DMD 500G, DMD 500B) configured to modulate light emitted from the solid light source, a projection unit (projection unit 150) configured to project light emitted from the light valve on a projection plane. The projection display apparatus is placed on a first placement surface substantially parallel to the projection plane or a second placement surface substantially orthogonal to the first placement surface. The housing case has a base plate (base plate 230) and a ceiling plate (ceiling plate 240), the base plate facing the second placement face, the ceiling plate being provided on an opposite side to the base plate. The ceiling plate is provided with a recessed portion recessed inward of the housing case. The recessed portion (ceiling-plate recessed portion 180) has an inclined surface inclining downward toward the projection plane. The inclined surface has a transmission area (transmission area 185) through which light emitted from the projection unit passes.

In the first aspect, side surfaces are provided on respective sides of the recessed portion in a horizontal direction parallel to the projection plane incline toward a center of the recessed portion.

In the first aspect, the ceiling plate is provided with an enlarged recessed portion (enlarged recessed portion 600) having a bottom plane (bottom plane 601) substantially horizontal. The recessed portion is provided in the bottom plane of the enlarged recessed portion.

In the first aspect, an angle of the inclined surface is determined according to a height of the housing case.

In the first aspect, the side surfaces are each formed of a non-reflecting member.

DETAILED DESCRIPTION OF THE EMBODIMENTS

Hereinafter, a projection display apparatus according to embodiments of the present invention will be described with reference to the drawings. In the following description of the drawings, the same or similar reference signs are attached to the same or similar units and portions.

It should be noted that the drawings are schematic and ratios of dimensions and the like are different from actual ones. Therefore, specific dimensions and the like should be determined in consideration of the following description. Moreover, it is needless to say that the drawings also include portions having different dimensional relationships and ratios from each other.

OVERVIEW OF EMBODIMENTS

A projection display apparatus of embodiments includes a housing case housing a solid light source, a light valve configured to modulate light emitted from the solid light source, a projection unit configured to project light emitted from the light valve on a projection plane. The projection display apparatus is placed on a first placement surface substantially parallel to the projection plane or a second placement surface substantially orthogonal to the first placement surface. The housing case has a base plate and a ceiling plate, the base plate facing the second placement face, the ceiling plate being provided on an opposite side to the base plate. The ceiling plate is provided with a recessed portion recessed inward of the housing case. The recessed portion has an inclined surface inclining downward toward the projection plane. The inclined surface has a transmission area through which light emitted from the projection unit passes.

In the embodiments, the recessed portion provided to the ceiling plate has the inclined surface inclining downward toward the projection plane and having the transmission area through which light emitted from the projection unit passes. Accordingly, light emitted from the solid light source is prevented from guided to an outside of the projection plane. Particularly, light that has passed the transmission area does not reach a user being on the opposite side of the projection display apparatus to the projection plane.

First Embodiment (Configuration of Projection Display Apparatus)

Figure 1:
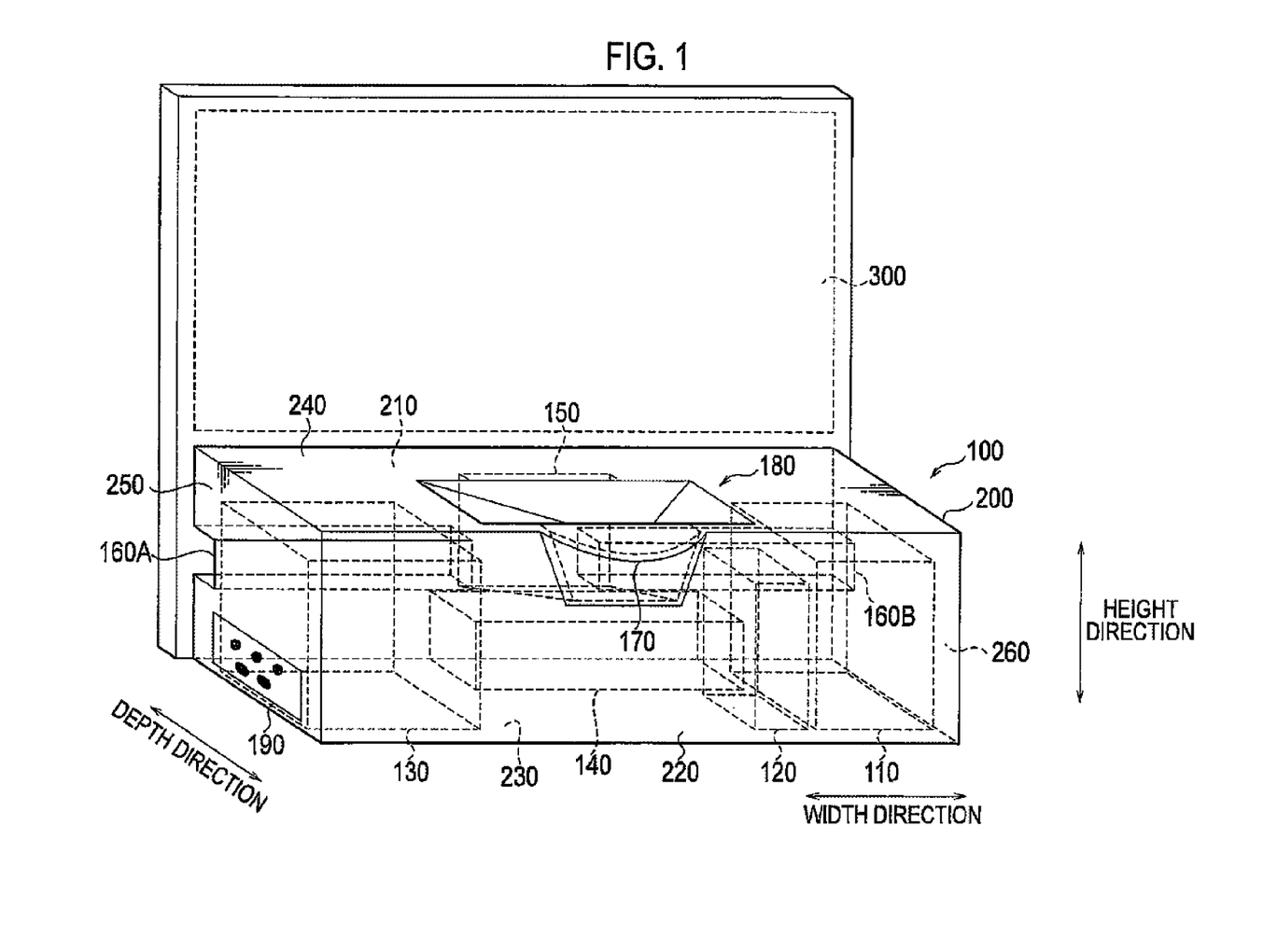
FIG. 1 is a perspective view of a projection display apparatus 100 according to a first embodiment.
Figure 2:
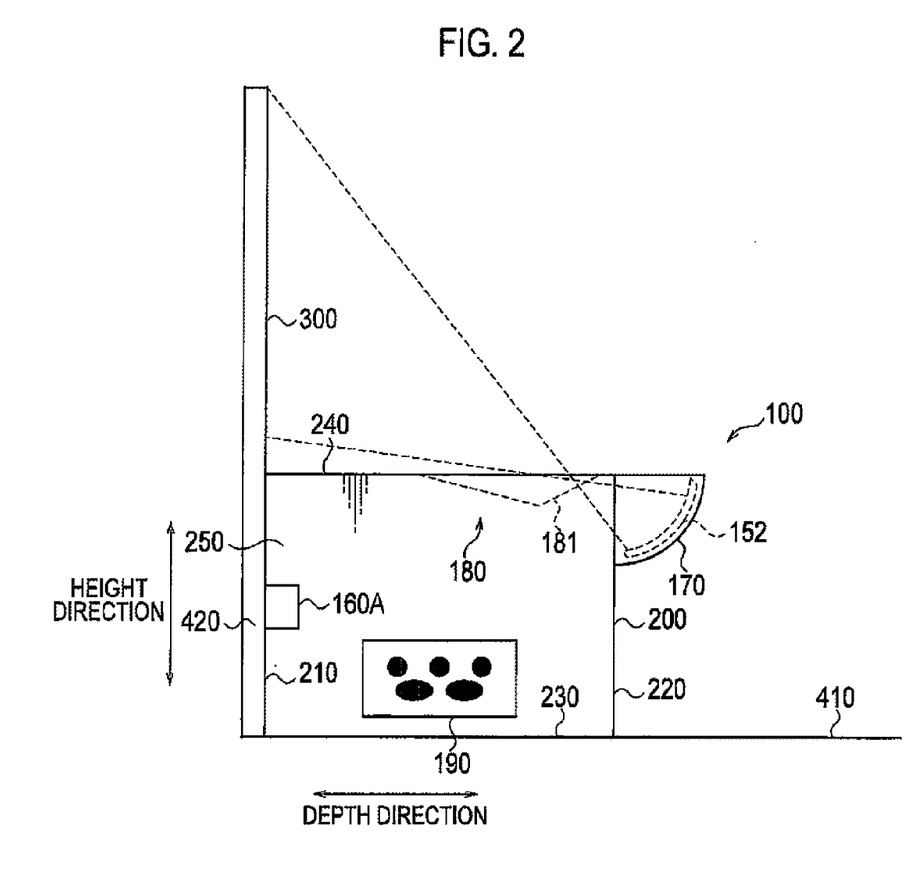
FIG. 2 is a view of the projection display apparatus 100 according to the first embodiment when viewed from side.

Hereinafter, a configuration of a projection display apparatus according to a first embodiment will be described with reference to FIGS. 1 and 2. FIG. 1 is a perspective view of a projection display apparatus 100 according to the first embodiment. FIG. 2 is a view of the projection display apparatus 100 according to the first embodiment when viewed from side.

As shown in FIGS. 1 and 2, the projection display apparatus 100 includes a housing case 200 and is configured to project an image on a projection plane 300. The projection display apparatus 100 is arranged along a first placement surface (a wall surface 420 shown in FIG. 2) and a second placement surface (a floor surface 410 shown in FIG. 2) substantially orthogonal to the first placement surface.

Here, the first embodiment is illustrated for a case where the projection display apparatus 100 projects image light on the projection plane 300 provided on a wall surface (wall surface projection). An arrangement of the housing case 200 in this case is referred to as a wall surface projection arrangement. In the first embodiment, the first placement surface substantially parallel to the projection plane 300 is the wall surface 420.

In the first embodiment, a horizontal direction parallel to the projection plane 300 is referred to as "a width direction", a orthogonal direction to the projection plane 300 is referred to as "a depth direction", and an orthogonal direction to both of the width direction and the depth direction is referred to as "a height direction".

The housing case 200 has a substantially rectangular parallelepiped shape. The size of the housing case 200 in the depth direction and the size of the housing case 200 in the height direction are smaller than the size of the housing case 200 in the width direction. The size of the housing case 200 in the depth direction is almost equal to a projection distance from a reflection mirror (a concave mirror 152 shown in FIG. 2) to the projection plane 300. In the width direction, the size of the housing case 200 is almost equal to the size of the projection plane 300. In the height direction, the size of the housing case 200 is determined depending on a position where the projection plane 300 is provided.

Specifically, the housing case 200 includes a projection-plane-side sidewall 210, a front-side sidewall 220, a base plate 230, a ceiling plate 240, a first-lateral-surface-side sidewall 250, and a second-lateral-surface-side sidewall 260.

The projection-plane-side sidewall 210 is a plate-shaped member facing the first placement surface (the wall surface 420 in the first embodiment) substantially parallel to the projection plane 300. The front-side sidewall 220 is a plate-shaped member provided on the side opposite from the projection-plane-side sidewall 210. The base plate 230 is a plate-shaped member facing the second placement surface (a floor surface 410 in the first embodiment) other than the first placement surface substantially parallel to the projection plane 300. The ceiling plate 240 is a plate-shaped member provided on the side opposite from the base plate 230. The first-lateral-surface-side sidewall 250 and the second-lateral-surface-side sidewall 260 are plate-shaped members forming both ends of the housing case 200 in the width direction.

The housing case 200 houses a light source unit 110, a power supply unit 120, a cooling unit 130, a color separating-combining unit 140, a projection unit 150. The projection-plane-side sidewall 210 includes a projection-plane-side recessed portion 160A and projection-plane-side recessed portion 160B. The front-side sidewall 220 includes front-side protruding portion 170. The ceiling plate 240 includes a ceiling-plate recessed portion 180. The first-lateral-surface-side sidewall 250 includes cable terminals 190.

Figure 4:
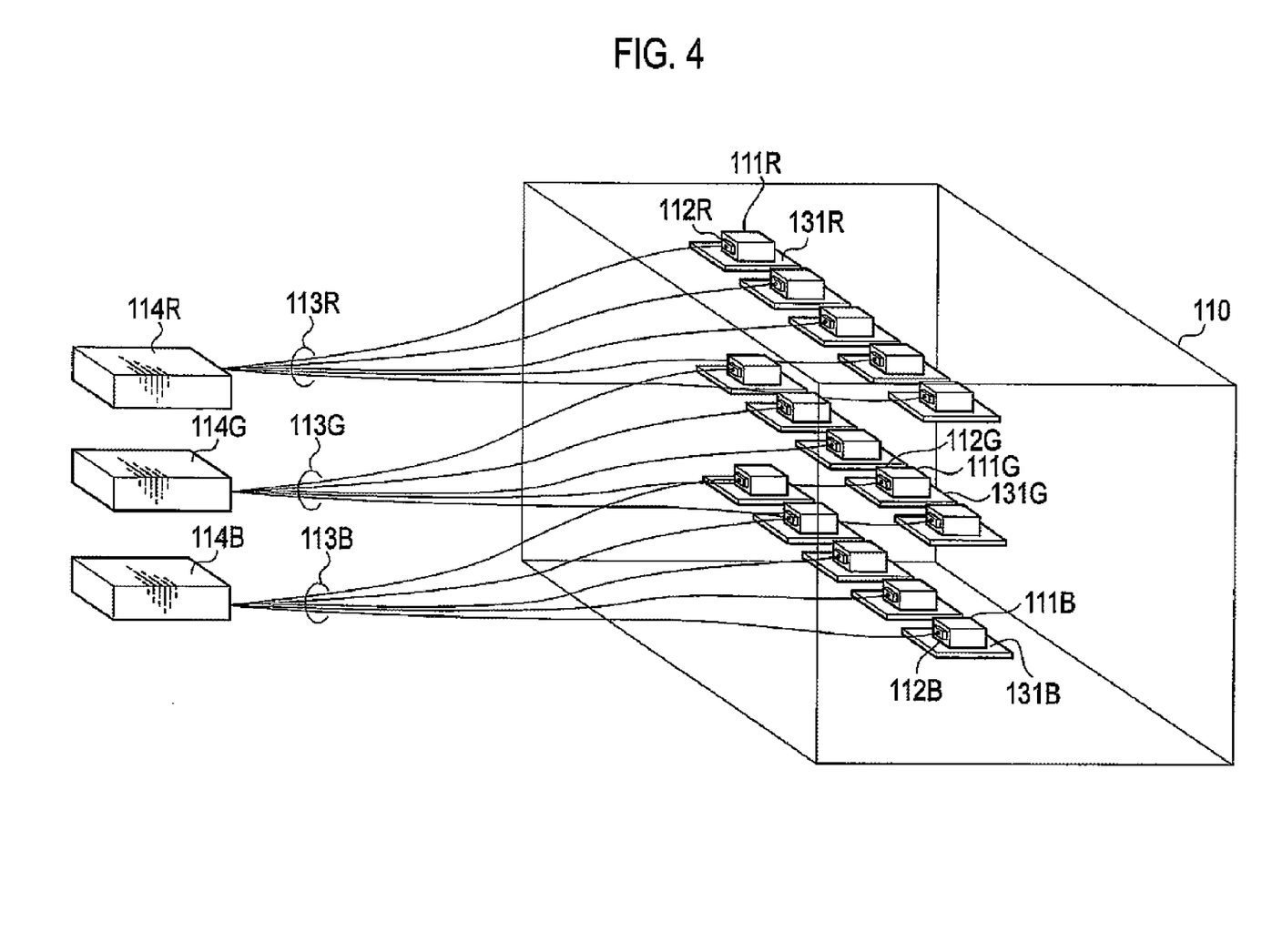
FIG. 4 is a view showing a light source unit 110 according to the first embodiment.

The light source unit 110 is a unit including multiple solid light sources (solid light sources 111 shown in FIG. 4). Each of the solid light sources 111 is a light source such as a laser diode (LD). In the first embodiment, the light source unit 110 includes red solid light sources (red solid light sources 111R shown in FIG. 4) configured to emit red component light R, green solid light sources (green solid light sources 111G shown in FIG. 4) configured to emit green component light G, and blue solid light sources (blue solid light sources 111E shown in FIG. 4) configured to emit blue component light B. The light source unit 110 will be described in detail below (see FIG. 4).

The power supply unit 120 is a unit to supply power to the projection display apparatus 100. The power supply unit 120 supplies power to the light source unit 110 and the cooling unit 130, for example.

The cooling unit 130 is a unit to cool the multiple solid light sources provided in the light source unit 110. Specifically, the cooling unit 130 cools each of the solid light sources by cooling jackets (cooling jackets 131 shown in FIG. 4) on which the solid light source is mounted.

The cooling unit 130 may be configured to cool the power supply unit 120 and a light valve (DMDs 500 which will be described later) in addition of the solid light sources.

The color separating-combining unit 140 combines the red component light R emitted from the red solid light sources, the green component light G emitted from the green solid light sources, and the blue component light B emitted from the blue solid light sources. In addition, the color separating-combining unit 140 separates combined light including the red component light R, the green component light G, and the blue component light B, and modulates the red component light R, the green component light G, and the blue component light B. Moreover, the color separating-combining unit 140 recombines the red component light R, the green component light G, and the blue component light B, and thereby emits image light to the projection unit 150. The color separating-combining unit 140 will be described in detail later (see FIG. 5).

The projection unit 150 projects the light (image light) outputted from the color separating-combining unit 140 on the projection plane 300. Specifically, the projection unit 150 includes a projection lens group (a projection lens group 151 shown in FIG. 5) configured to project the light outputted from the color separating-combining unit 140 on the projection plane 300, and a reflection mirror (a concave mirror 152 shown in FIG. 5) configured to reflect the light, outputted from the projection lens group, to the projection plane 300. The projection unit 150 will be described in detail later.

The projection-plane-side recessed portion 160A and the projection-plane-side recessed portion 160B are provided in the projection-plane-side sidewall 210, and each have a shape recessed inward of the housing case 200. The projection-plane-side recessed portion 160A and the projection-plane-side recessed portion 160B extend to the respective ends of the housing case 200. The projection-plane-side recessed portion 160A and the projection-plane-side recessed portion 160B are each provided with a vent hole through which the inside and the outside of the housing case 200 are in communication with each other.

In the first embodiment, the projection-plane-side recessed portion 160A and the projection-plane-side recessed portion 160B extend in the width direction of the housing case 200. For example, the projection-plane-side recessed portion 160A is provided with an air inlet as the vent hole for allowing the air outside the housing case 200 to flow into the inside of the housing case 200. The projection-plane-side recessed portion 160B is provided with an air outlet as the vent hole for allowing the air inside the housing case 200 to flow out into the outside of the housing case 200.

The front-side protruding portion 170 is provided in the front-side sidewall 220, and has a shape protruding to the outside of the housing case 200. The front-side protruding portion 170 is provided at a substantially center portion of the front-side sidewall 220 in the width direction of the housing case 200. A space formed by the front-side protruding portion 170 inside the housing case 200 is used for placing the projection unit 150 (the concave mirror 152 shown in FIG. 5).

The ceiling-plate recessed portion 180 is provided in the ceiling plate 240, and has a shape recessed inward of the housing case 200. The ceiling-plate recessed portion 180 includes an inclined surface 181 extending downwardly toward the projection plane 300. The inclined surface 181 has a transmission area through which light outputted from the projection unit 150 is transmitted (projected) toward the projection plane 300.

The cable terminals 190 are provided to the first-lateral-surface-side sidewall 250, and are terminals such as a power supply terminal and an image signal terminal. Here, the cable terminals 190 may be provided to the second-lateral-surface-side sidewall 260.

(Arrangement of Units in Housing Case in Width Direction)

Figure 3:
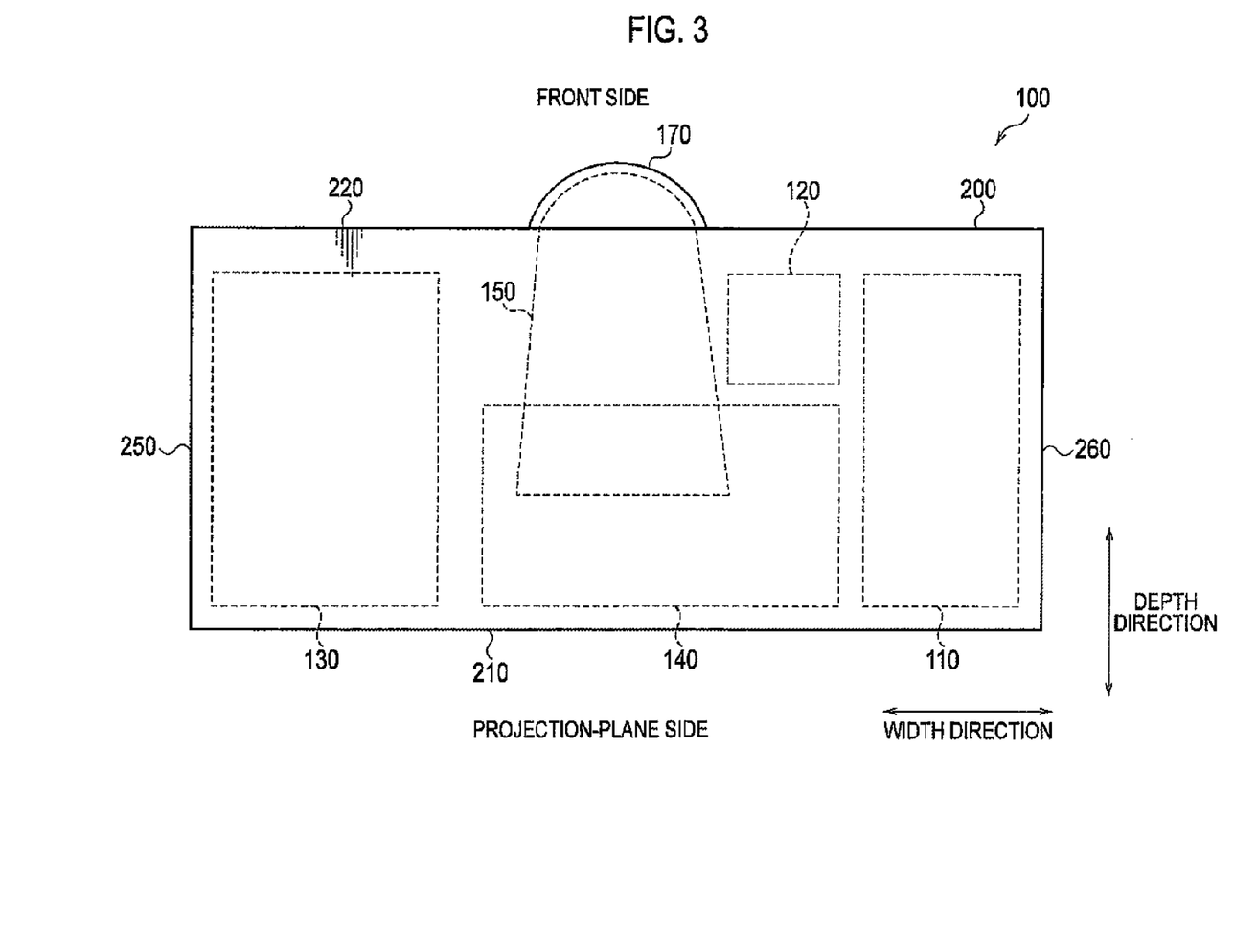
FIG. 3 is a view of the projection display apparatus 100 according to the first embodiment when viewed from above.

Hereinafter, arrangement of the units in the width direction in the first embodiment will be described with reference to FIG. 3. FIG. 3 is a view of the projection display apparatus 100 according to the first embodiment when viewed from above.

As shown in FIG. 3, the projection unit 150 is arranged in a substantially center of the housing case 200 in a horizontal direction parallel to the projection plane 300 (in the width direction of the housing case 200).

The light source unit 110 and the cooling unit 130 are arranged in the line with the projection unit 150 in the width direction of the housing case 200. Specifically, the light source unit 110 is arranged in the line at one of the sides of the projection unit 150 in the width direction of the housing case 200 (the side extending toward the second-lateral-surface-side sidewall 260). The cooling unit 130 is arranged in the line at the other side of the projection unit 150 in the width direction of the housing case 200 (the side extending to the first-lateral-surface-side sidewall 250).

The power supply unit 120 is arranged in the line, with the projection unit 150 in the width direction of the housing case 200. Specifically, the power supply unit 120 is arranged in the line at the same side of the projection unit 150 as the light source unit 110 in the width direction of the housing case 200. The power supply unit 120 is preferably arranged between the projection unit 150 and the light source unit 110.

(Configuration of Light Source Unit)

Hereinafter, a configuration of the light source unit according to the first embodiment will be described with reference to FIG. 4. FIG. 4 is a view showing the light source unit 110 according to the first embodiment.

As shown in FIG. 4, the light source unit 110 includes multiple red solid light sources 111R, multiple green solid light sources 111G and multiple blue solid light sources 111B.

The red solid light sources 111R are red solid light sources, such as LDs, configured to emit red component light R as described above. Each of the red solid light sources 111R includes a head 112R to which an optical fiber 113R is connected.

The optical fibers 113R connected to the respective heads 112R of the red solid light sources 111R are bundled by a bundle unit 114R. In other words, the light beams emitted from the respective red solid light sources 111R are transmitted through the optical fibers 113R, and thus are gathered into the bundle unit 114R.

The red solid light sources 111B are mounted on respective cooling jackets 131R. For example, the red solid light sources 111R are fixed to respective cooling jackets 131R by screwing. The red solid light sources 111R are cooled by respective cooling jackets 131R.

The green solid light sources 111G are green solid light sources, such as LDs, configured to emit green component light G as described above. Each of the green solid light sources 111G includes a head 112G to which an optical fiber 113G is connected.

The optical fibers 113G connected to the respective heads 112G of the green solid light sources 111G are bundled by a bundle unit 114G. In other words, the light beams emitted from all the green solid light sources 111G are transmitted through the optical fibers 113G, and thus are gathered into the bundle unit 114G.

The green solid light sources 111G are mounted on respective cooling jackets 131G. For example, the green solid light sources 111G are fixed to respective cooling jackets 131G by screwing. The green solid light sources 111G are cooled by respective cooling jackets 131G.

The blue solid light sources 111B are blue solid light sources, such as LDs, configured to emit blue component light B as described above. Each of the blue solid light sources 111B includes a head 112B to which an optical fiber 113B is connected.

The optical fibers 113B connected to the respective heads 112B of the blue solid light sources 111B are bundled by a bundle unit 114B. In other words, the light beams emitted from all the blue solid light sources 111B are transmitted through the optical fibers 113B, and thus are gathered into the bundle unit 114B.

The blue solid light sources 111B are mounted on respective cooling jackets 131B. For example, the blue solid light sources 111B are fixed to respective cooling jackets 131B by screwing. The blue solid light sources 111B are cooled by respective cooling jackets 131B.

(Configurations of Color Separating-Combining Unit and Projection Unit)

Figure 5:
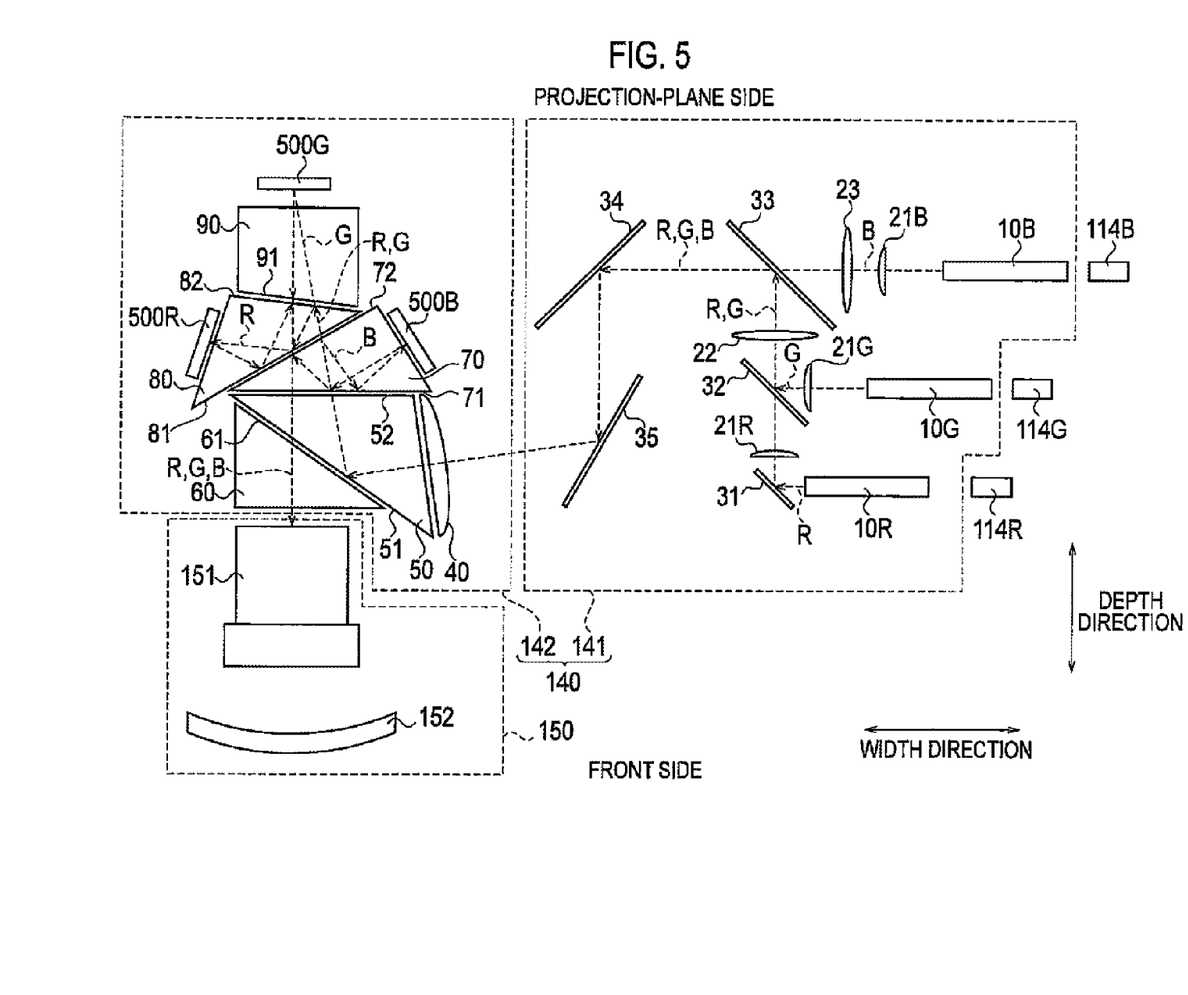
FIG. 5 is a view of a color separating-combining unit 140 and a projection unit 150 according to the first embodiment.

Hereinafter, configurations of the color separating combining unit and the projection unit according to the first embodiment will be described with reference to FIG. 5. FIG. 5 is a view showing the color separating-combining unit 140 and the projection unit 150 according to the first embodiment. The projection display apparatus 100 based on the DLP (Digital Light Processing) technology (registered trademark) is illustrated in the first embodiment.

As shown in FIG. 5, the color separating-combining unit 140 includes a first unit 141 and a second unit 142.

The first unit 141 is configured to combine the red component light R, the green component light G, and the blue component light B, and to output the combine light including the red component light R, the green component light G, and the blue component light B to the second unit 142.

Specifically, the first unit 141 includes multiple rod integrators (a rod integrator 10R, a rod integrator 10G, and a rod integrator 10B), a lens group (a lens 21R, a lens 21G, a lens 21B, a lens 22, and a lens 23), and a mirror group (a mirror 31, a mirror 32, a mirror 33, a mirror 34, and a mirror 35).

The rod integrator 10R includes a light incident surface, a light output surface, and a light reflection side surface provided between an outer circumference of the light incident surface and an outer circumference of the light output surface. The rod integrator 10R uniformizes the red component light R outputted from the optical fibers 113R bundled by the bundle unit 114R. More specifically, the rod integrator 10R makes the red component light R uniform by reflecting the red component light R with the light reflection side surface.

The rod integrator 10G includes a light incident surface, a light output surface, and a light reflection side surface provided between an outer circumference of the light incident surface and an outer circumference of the light output surface. The rod integrator 10G uniformizes the green component light G outputted from the optical fibers 113G bundled by the bundle unit 114G. More specifically, the rod integrator 10G makes the green component light G uniform by reflecting the green component light G with the light reflection side surface.

The rod integrator 10B includes a light incident surface, a light output surface, and a light reflection side surface provided between an outer circumference of the light incident surface and an outer circumference of the light output surface. The rod integrator 10B uniformizes the blue component light B outputted from the optical fibers 113B bundled by the bundle unit 114B. More specifically, the rod integrator 10B makes the blue component light B uniform by reflecting the blue component light B with the light reflection side surface.

Incidentally, each of the rod integrator 10R, the rod integrator 10G, and the rod integrator 10B may be a hollow rod including a mirror surface as the light reflection side surface. Instead, each of the rod integrator 10R, the rod integrator 10G, and the rod integrator 10B may be a solid rod formed of a glass.

Here, each of the rod integrator 10R, the rod integrator 10G, and the rod integrator 10B has a columnar shape extending in a horizontal direction substantially parallel to the projection plane 300 (in the width direction of the housing case 200). In other words, the rod integrator 10R is arranged so that the longitudinal direction of the rod integrator 10R can extend substantially in the width direction of the housing case 200. Similarly, the rod integrator 10G and the rod integrator 10B are arranged so that the respective longitudinal directions of the rod integrator 10G and the rod integrator 10B can extend substantially in the width direction of the housing case 200. The rod integrator 10R, the rod integrator 10G, and the rod integrator 10B are arranged in the line on a single horizontal plane substantially orthogonal to the projection plane 300 (a plane parallel to the ceiling plate 240).

The lens 21R is a lens configured to make the red component light R substantially parallel so that the substantially parallel red component light R can enter a DMD 500R. The lens 21G is a lens configured to make the green component light G substantially parallel so that the substantially parallel green component light G can enter a DMD 500G. The lens 21B is a lens configured to make the blue component light B substantially parallel so that the substantially parallel blue component light B can enter onto a DMD 500B.

The lens 22 is a lens configured to cause the red component light and the green component light G to substantially form images on the DMD 500R and the DMD 500G, respectively, while controlling the expansion of the red component light R and the green component light G. The lens 23 is a lens configured to cause the blue component light B to substantially form an image on the DMD 500B while controlling the expansion of the blue component light B.

The mirror 31 reflects the red component light R outputted from the rod integrator 10R. The mirror 32 is a dichroic mirror configured to reflect the green component light G outputted from the rod integrator 10G, and to transmit the red component light R. The mirror 33 is a dichroic mirror configured to transmit the blue component light B outputted from the rod integrator 10B, and to reflect the red component light R and the green component light G.

The mirror 34 reflects the red component light R, the green component light G, and the blue component light B. The mirror 35 reflects the red component light R, the green component light G, and the blue component light B to the second unit 142. Here, FIG. 5 shows the configurations in a plan view for simplification of the description; however, the mirror 35 actually reflects the red component light R, the green component light G, and the blue component light B obliquely in the height direction.

The second unit 142 separates the red component light R, the green component light G, and the blue component light B from each other, and modulates the red component light R, the green component light G, and the blue component light B. Subsequently, the second unit 142 recombines the red component light R, the green component light G, and the blue component light B, and outputs the image light to the projection unit 150.

Specifically, the second unit 142 includes a lens 40, a prism 50, a prism 60, a prism 70, a prism 80, a prism 90, and multiple digital micromirror devices (DMDs: a DMD 500R, a DMD 500G and a DMD 500B).

The lens 40 is a lens configured to make the light outputted from the first unit 141 substantially parallel so that the substantially parallel light of each color component can enter the DMD of the same color.

The prism 50 is made of a light transmissive material, and includes a surface 51 and a surface 52. An air gap is provided between the prism 50 (the surface 51) and the prism 60 (a surface 61), and an angle (incident angle) at which the light outputted from the first unit 141 enters the surface 51 is larger than a total reflection angle. For this reason, the light outputted from the first unit 141 is reflected by the surface 51. On the other hand, an air gap is also provided between the prism 50 (the surface 52) and the prism 70 (a surface 71), and an angel (incident angle) at which the light outputted from the first unit 141 enters the surface 52 is smaller than the total reflection angle. Thus, the light reflected by the surface 51 passes through the surface 52.

The prism 60 is made of a light transmissive material, and includes the surface 61.

The prism 70 is made of a light transmissive material, and includes a surface 71 and a surface 72. An air gap is provided between the prism 50 (the surface 52) and the prism 70 (the surface 71), and an angle (incident angle) at which each of the blue component light B reflected by the surface 72 and the blue component light B outputted from the DMD 500B enters the surface 71 is larger than the total reflection angle. Accordingly, the blue component light B reflected by the surface 72 and the blue component light B outputted from the DMD 500B are reflected by the surface 71.

The surface 72 is a dichroic mirror surface configured to transmit the red component light R and the green component light G and to reflect the blue component light B. Thus, in the light reflected by the surface 51, the red component light R and the green component light G pass through the surface 72, but the blue component light B is reflected by the surface 72. The blue component light B reflected by the surface 71 is again reflected by the surface 72.

The prism 80 is made of a light transmissive material, and includes a surface 81 and a surface 82. An air gap is provided between the prism 70 (the surface 72) and the prism 80 (the surface 81). Since an angle (incident angle) at which each of the red component light R passing through the surface 81 and then reflected by the surface 82, and the red component light R outputted from the DMD 500R again enters the surface 81 is larger than the total reflection angle, the red component light R passing through the surface 81 and then reflected by the surface 82, and the red component light R outputted from the DMD 500R are reflected by the surface 81. On the other hand, since an angle (incident angle) at which the red component light R outputted from the DMD 500R, reflected by the surface 81, and then reflected by the surface 82 again enters the surface 81 is smaller than the total reflection angle, the red component light R outputted from the DMD 500R, reflected by the surface 81, and then reflected by the surface 82 passes through the surface 81.

The surface 82 is a dichroic mirror surface configured to transmit the green component light G and to reflect the red component light R. Hence, in the light passing through the surface 81, the green component light G passes through the surface 82, whereas the red component light R is reflected by the surface 82. The red component light R reflected by the surface 81 is reflected by the surface 82. The green component light G outputted from the DMD 500G passes through the surface 82.

Here, the prism 70 separates the blue component light B from the combine light including the red component light R and the green component light G by means of the surface 72. The prism 80 separates the red component light R and the green component light G from each other by means of the surface 82. In short, the prism 70 and the prism 80 function as a color separation element to separate the color component light by colors.

Note that, in the first embodiment, a cut-off wavelength of the surface 72 of the prism 70 is set at a value between a wavelength range corresponding to a green color and a wavelength range corresponding to a blue color. In addition, a cut-off wavelength of the surface 82 of the prism 80 is set at a value between a wavelength range corresponding to a red color and the wavelength range corresponding to the green color.

Meanwhile, the prism 70 combines the blue component light B and the combine light including the red component light R and the green component light G by means of the surface 72. The prism 80 combines the red component light R and the green component light G by means of the surface 82. In short, the prism 70 and the prism 80 function as a color combining element to combine color component light of all the colors.

The prism 90 is made of a light transmissive material, and includes a surface 91. The surface 91 is configured to transmit the green component light G. Here, the green component light G entering the DMD 500G and the green component light G outputted from the DMD 500G pass through the surface 91.

The DMD 500R, the DMD 500G and the DMD 500B are each formed of multiple movable micromirrors. Each of the micromirrors corresponds to one pixel, basically. The DMD 500R changes the angle of each micromirror to switch whether or not to reflect the red component light R toward the projection unit 150. Similarly, the DMD 500G and the DMD 500B change the angle of each micromirror to switch whether or not to reflect the green component light G and the blue component light B toward the projection unit 150, respectively.

The projection unit 150 includes a projection lens group 151 and a concave mirror 152.

The projection lens group 151 outputs the light (image light) outputted from the color separating-combining unit 140 to the concave mirror 152.

The concave mirror 152 reflects the light (image light) outputted from the projection lens group 151. The concave mirror 152 collects the image light, and then scatters the image light over a wide angle. For example, the concave mirror 152 is an aspherical mirror having a surface concave toward the projection lens group 151.

The image light collected by the concave mirror 152 passes through the transmission area provided in the inclined surface 181 of the ceiling-plate recessed portion 180 formed in the ceiling plate 240. The transmission area provided in the inclined surface 181 is preferably provided near a place where the image light is collected by the concave mirror 152.

The concave mirror 152 is housed in the space formed by the front-side protruding portion 170, as described above. For example, the concave mirror 152 is preferably fixed to the inside of the front-side protruding portion 170. In addition, the inner surface of the front-side protruding portion 170 preferably has a shape along the concave mirror 152.

(Concave Part Provided in the Ceiling Plate)

With reference to the drawings, a description is given below of the concave part provided in the ceiling plate according to the first embodiment. FIGS. 6 to 10 are views each showing the ceiling-plate recessed portion 180 according to the first embodiment.

Figure 6:
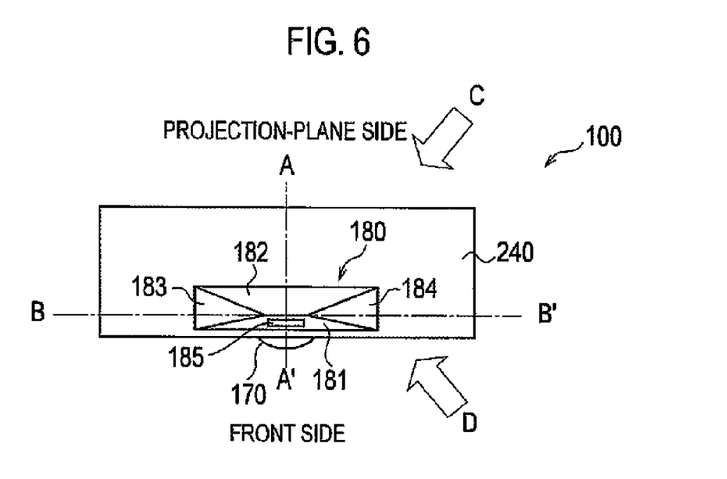
FIG. 6 is a view illustrating a ceiling-plate recessed portion 180 according to the first embodiment.
Figure 7:
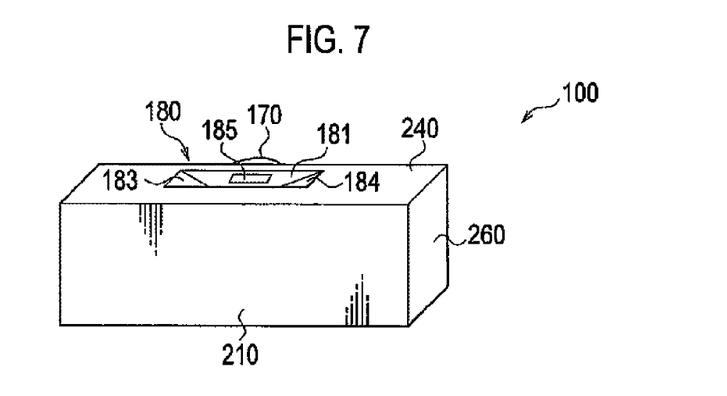
FIG. 7 is a view illustrating a ceiling-plate recessed portion 180 according to the first embodiment.
Figure 8:
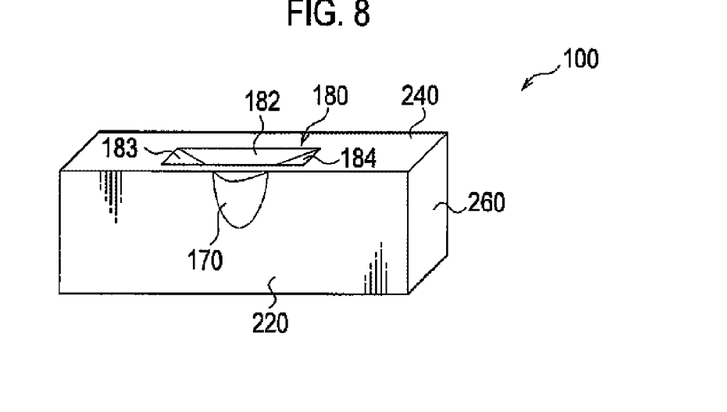
FIG. 8 is a view illustrating a ceiling-plate recessed portion 180 according to the first embodiment.
Figure 9:
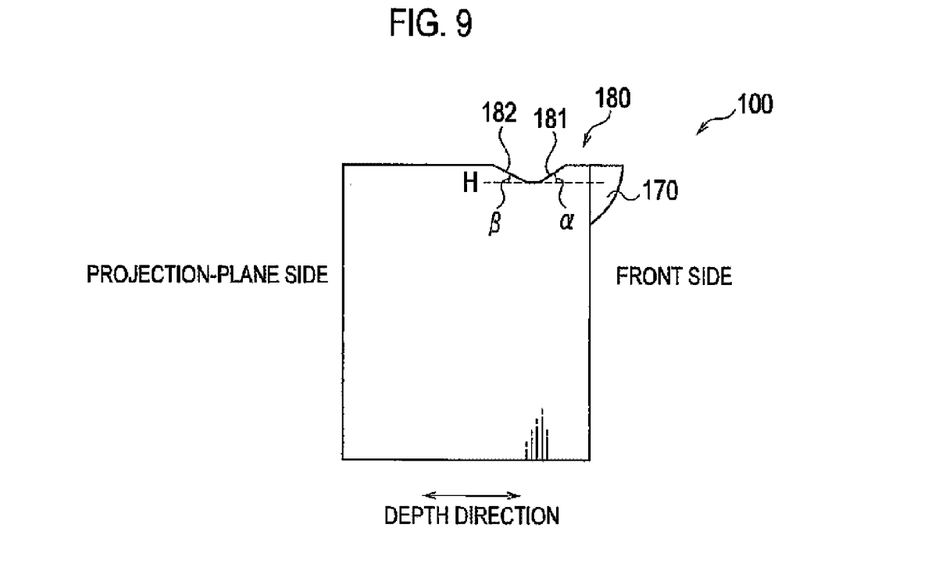
FIG. 9 is a view illustrating a ceiling-plate recessed portion 180 according to the first embodiment.
Figure 10:
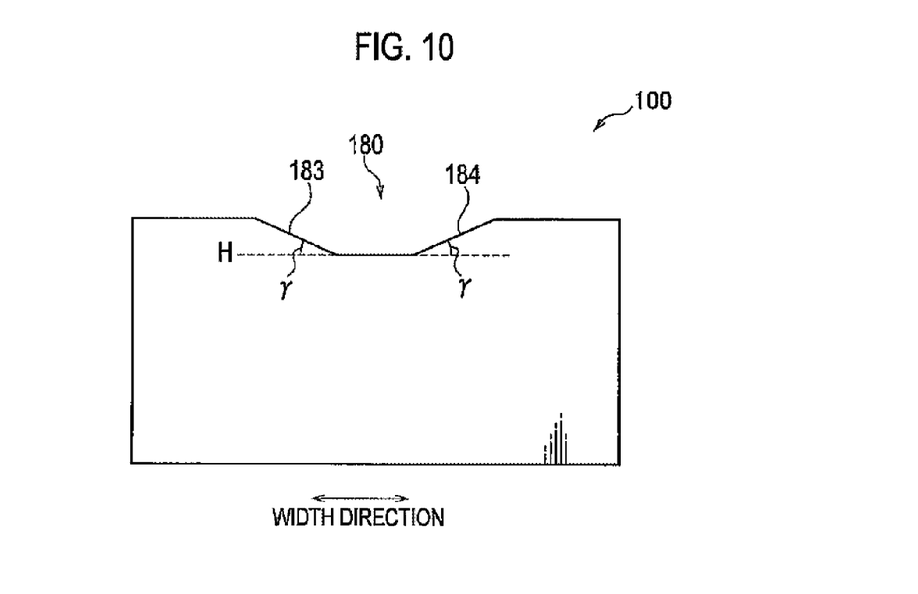
FIG. 10 is a view illustrating a ceiling-plate recessed portion 180 according to the first embodiment.

Specifically, FIG. 6 is a view of the projection display apparatus 100 seen from the ceiling plate 240 side. FIG. 7 is a view of the projection display apparatus 100 seen in a direction C in FIG. 6. FIG. 8 is a view of the projection display apparatus 100 seen in a direction D in FIG. 6. FIG. 9 is a cross-sectional view of the projection display apparatus 100, taken along an A-A' line shown in FIG. 6. FIG. 10 is a cross-sectional view of the projection display apparatus 100, taken along a B-B' line shown in FIG. 6.

As FIGS. 6 to 10 show, the ceiling plate 240 is provided with the ceiling-plate recessed portion 180. In addition to the inclined surface 181 described above, the ceiling-plate recessed portion 180 has an inclined surface 182, an inclined surface 183, and an inclined surface 184.

The inclined surface 181 is provided on the front side of the ceiling-plate recessed portion 180, and has a shape inclining downward toward the projection plane 300. The inclination angle of the inclined surface 181 with respect to a horizontal plane H is represented by α. The value of α is determined according to the height of the housing case 200. As described above, the inclined surface 181 is provided with the transmission area 185 through which light emitted from the projection unit 150 passes toward the projection plane 300.

The inclined surface 182 is provided on the projection plane 300 side on the ceiling-plate recessed portion 180, and has a shape inclining downward toward the front side. The inclination angle of the inclined surface 182 with respect to the horizontal plane H is represented by β. The value of β is determined so that, among light that has passed through the transmission area 185, light to be applied on the projection plane 300 will not be shielded by the inclined surface 182.

The inclined surface 183 and the inclined surface 184 are provided respectively on both sides of the ceiling-plate recessed portion 180 in the width direction of the housing case 200. The inclination angle of each of the inclined surface 183 and the inclined surface 184 with respect to the horizontal plane H is represented by γ. The values of γ are determined so that, among light that has passed through the transmission area 185, light to be applied on the projection plane 300 will not be shielded by the inclined surface 183 and the inclined surface 184, respectively. The inclined surface 183 and the inclined surface 184 are each preferably formed of a non-reflecting member which does not reflect light.

ADVANTAGEOUS EFFECTS

In the first embodiment, the ceiling-plate recessed portion 180 provided in the ceiling plate 240 has the inclined surface 181 inclining downward toward the projection plane 300 and having the transmission area 185 through which light emitted from the projection unit 150 passes. Accordingly, light emitted from the solid light source 111 is prevented from travelling to an outside of the projection plane 300. Particularly, light that has passed the transmission area 185 does not reach a user being on the opposite side of the projection display apparatus 100 to the projection plane 300.

[Modification 1]

Modification 1 of the first embodiment will be described below with reference to the drawings. Differences from the first embodiment are mainly described below.

Specifically, in modification 1, the ceiling plate 240 is provided with an enlarged concave part having a bottom plane substantially horizontal. The bottom plane of the enlarged concave part is provided with the ceiling-plate recessed portion 180.

(Concave Part Provided in the Ceiling Plate)

With reference to the drawings, a description is given below of the concave part provided in the ceiling plate according to modification 1. FIGS. 11 to 15 are views each showing the ceiling-plate recessed portion 180 according to modification 1.

Figure 11:
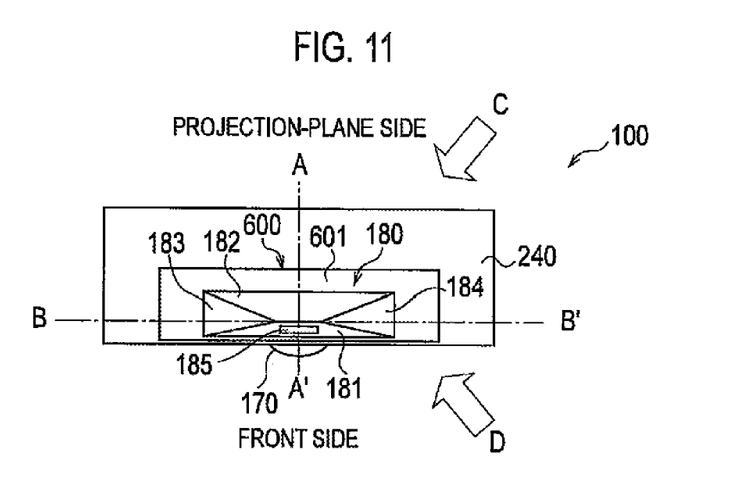
FIG. 11 is a view illustrating a ceiling-plate recessed portion 180 according to a modification 1.
Figure 12:
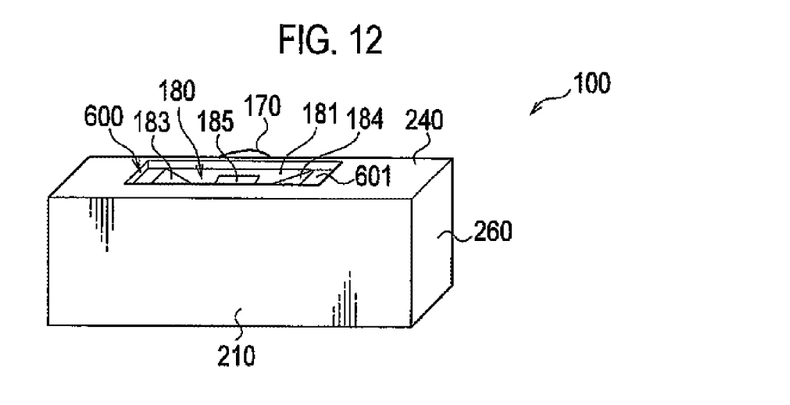
FIG. 12 is a view illustrating a ceiling-plate recessed portion 180 according to a modification 1.
Figure 13:
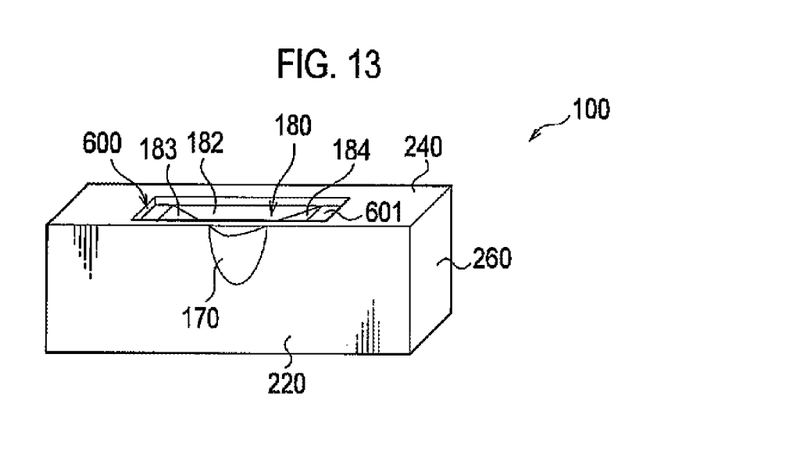
FIG. 13 is a view illustrating a ceiling-plate recessed portion 180 according to a modification 1.
Figure 14:
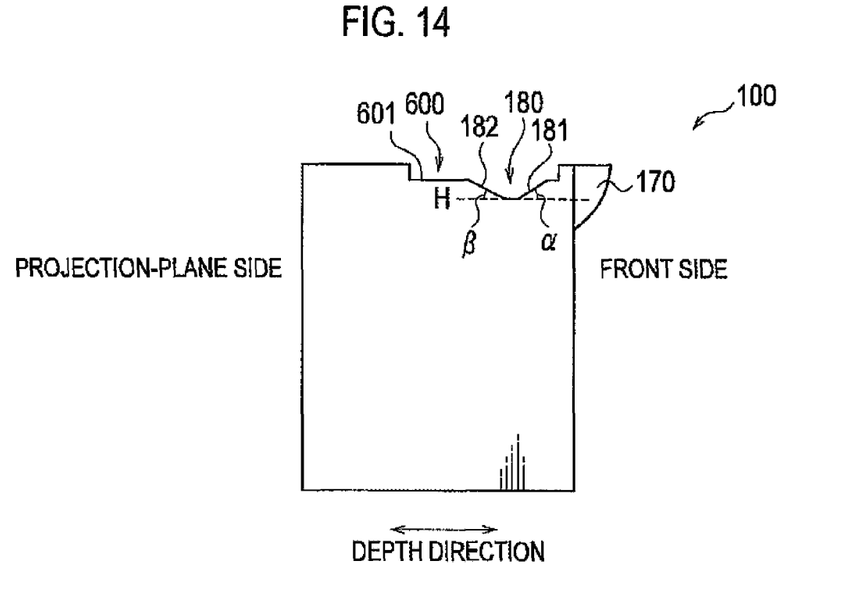
FIG. 14 is a view illustrating a ceiling-plate recessed portion 180 according to a modification 1.
Figure 15:
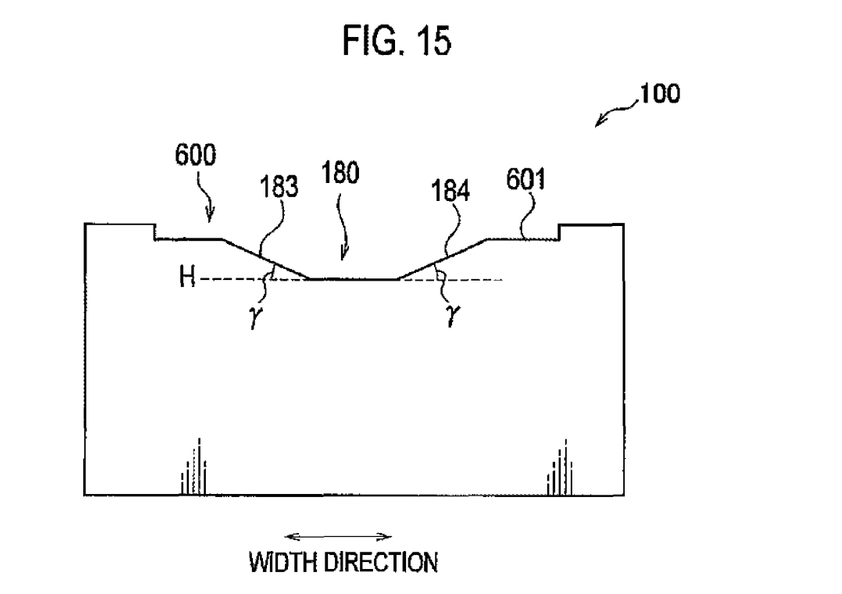
FIG. 15 is a view illustrating a ceiling-plate recessed portion 180 according to a modification 1.

Specifically, FIG. 11 is a view of the projection display apparatus 100 seen from the ceiling plate 240 side. FIG. 12 is a view of the projection display apparatus 100 seen in a direction C in FIG. 11. FIG. 13 is a view of the projection display apparatus 100 seen in a direction D in FIG. 11. FIG. 14 is a cross-sectional view of the projection display apparatus 100, taken along an A-A' line shown in FIG. 11. FIG. 15 is a cross-sectional view of the projection display apparatus 100, taken along a B-B' line shown in FIG. 11.

As FIGS. 11 to 15 show, the ceiling plate 240 is provided with an enlarged recessed portion 600 having a bottom plane 601 substantially horizontal. The ceiling-plate recessed portion 180 described above is provided in the bottom plane 601 of the enlarged recessed portion 600. Side faces constituting walls around the enlarged recessed portion 600 preferably incline at a substantially right angle to the bottom plane 601.

The configuration of the ceiling-plate recessed portion 180 is the same as that in the first embodiment, and therefore the description therefore is omitted here.

Second Embodiment

Hereinafter, a second embodiment will be described with reference to the drawings. Differences from the first embodiment will be mainly described below.

Specifically, the first embodiment has been illustrated for the case where the projection display apparatus 100 projects image light onto the projection plane 300 provided to the wall surface. In contrast, the second embodiment will be illustrated for a case where a projection display apparatus 100 projects image light onto a projection plane 300 provided on a floor surface (floor surface projection). An arrangement of a housing case 200 in this case is referred to as a floor surface projection arrangement.

(Configuration of Projection Display Apparatus)

Figure 16:
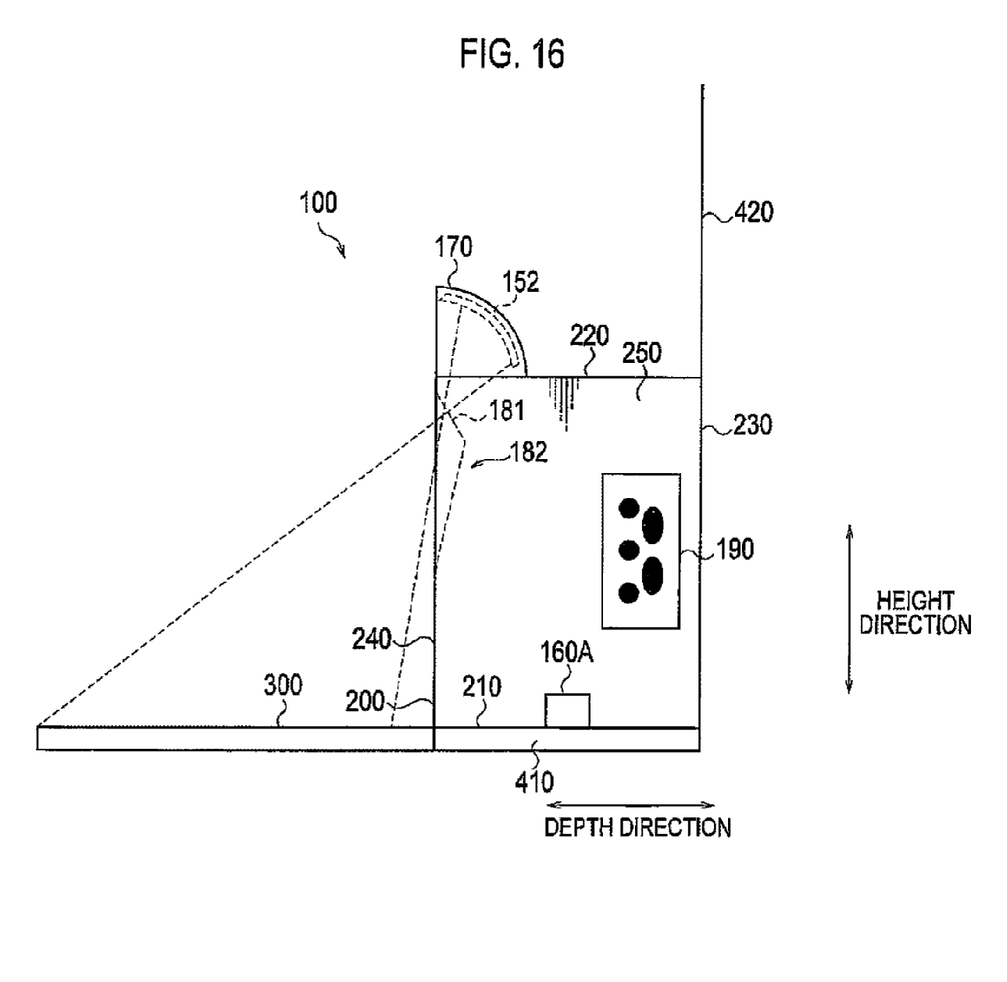
FIG. 16 is a view of a projection display apparatus 100 according to a second embodiment when viewed from side.

Hereinafter, description will be provided for a configuration of a projection display apparatus according to the second embodiment with reference to FIG. 16. FIG. 16 is a view of a projection display apparatus 100 according to the second embodiment when viewed from side.

As shown in FIG. 16, the projection display apparatus 100 projects image light onto the projection plane 300 provided on the floor surface (floor surface projection). In the second embodiment, a floor surface 410 is a first placement surface substantially parallel to the projection plane 300, and a wall surface 420 is a second placement surface substantially orthogonal to the first placement surface.

In the second embodiment, a horizontal direction parallel to the projection plane 300 is referred to as "a width direction", an orthogonal direction to the projection plane 300 is referred to as "a height direction", and an orthogonal direction crossing both the width direction and the height direction is referred to as "a depth direction".

In the second embodiment, the housing case 200 has a substantially rectangular parallelepiped shape as similar to the first embodiment. The size of the housing case 200 in the depth direction and the size of the housing case 200 in the height direction are smaller than the size of the housing case 200 in the width direction. The size of the housing case 200 in the height direction is almost equal to a projection distance from a reflection mirror (the concave mirror 152 shown in FIG. 2) to the projection plane 300. In the width direction, the size of the housing case 200 is almost equal to the size of the projection plane 300. In the depth direction, the size of the housing case 200 is determined depending on a distance from the wall surface 420 to the projection plane 300.

A projection-plane-side sidewall 210 is a plate-shaped member facing the first placement surface (the floor surface 410 in the second embodiment) substantially parallel to the projection plane 300. A front-side sidewall 220 is a plate-shaped member provided on the side opposite from the projection-plane-side sidewall 210. A ceiling plate 240 is a plate-shaped member provided on the side opposite from a base plate 230. The base plate 230 is a plate-shaped member facing the second placement surface (the wall surface 420 in the second embodiment) different from the first placement surface substantially parallel to the projection plane 300. A first-lateral-surface-side sidewall 250 and a second-lateral-surface-side sidewall 260 are plate-shaped members forming both ends of the housing case 200 in the width direction.

Other Embodiments

As described above, the details of the present invention have been described by using the embodiments of the present invention. However, it should not be understood that the description and drawings which constitute part of this disclosure limit the present invention. From this disclosure, various alternative embodiments, examples, and operation techniques will be easily found by those skilled in the art.

In the first embodiment, the projection plane 300 is provided on the wall surface 420 on which the housing case 200 is arranged. However, an embodiment is not limited to this case. The projection plane 300 may be provided in a position behind the wall surface 420 in a direction away from the housing case 200.

In the second embodiment, the projection plane 300 is provided on the floor surface 410 on which the housing case 200 is arranged. However, an embodiment is not limited to this case. The projection plane 300 may be provided in a position lower than the floor surface 410.

In the embodiments, a DMD (a digital micromirror device) has been used merely as an example of the light valve. The light valve may be a transmissive liquid crystal panel or a reflective liquid crystal panel.

In the embodiments, the transmission area 185 is provided to the inclined surface 181 in order to prevent light emitted from the solid light source from guided to an outside of the projection plane. In addition to this configuration, a protection glass as high as the upper edge of the projection plane 300 may be placed along the front-side sidewall 220. This prevents a user from looking into the transmission area 185. An AR coating is preferably applied to both sides of the protection glass.

Further, the protection glass may have a box shape being as high as the lower edge of the projection plane 300 and covering the ceiling plate 240.

Moreover, a cover made of a shielding material such as black plastic may be provided as long as the cover is configured not to inhibit luminous flux of image light.

The inclined surface 182 is provided with nothing in the embodiments, but may be provided with a vent hole. Wind from the exhaust port can prevent attachment of dust and the like to the pass-through area 185. It is more effective if a fan is also placed near the vent hole.

The term "substantially" allows a margin of ±10%, when the term "substantially" is used for structural meaning. On the other hand, The term "substantially" allows a margin of ±5%, when the term "substantially" is used for optical meaning.

What is claimed is:

1. A projection display apparatus which includes a housing case housing a solid light source, a light valve configured to modulate light emitted from the solid light source, a projection unit configured to project light emitted from the light valve on a projection plane, which is placed on a first placement surface substantially parallel to the projection plane or a second placement surface substantially orthogonal to the first placement surface, wherein
    the housing case has a base plate and a ceiling plate, the base plate facing the second placement face, the ceiling plate being provided on an opposite side to the base plate,
    the ceiling plate is provided with a recessed portion recessed inward of the housing case,
    the recessed portion has an inclined surface inclining downward toward the projection plane, and
    the inclined surface has a transmission area through which light emitted from the projection unit passes, wherein
    side surfaces are provided on respective sides of the recessed portion in a horizontal direction parallel to the projection plane incline toward a center of the recessed portion.

2. The projection display apparatus according to claim 1, wherein
    the side surfaces are each formed of a non-reflecting member.

3. A projection display apparatus which includes a housing case housing a solid light source, a light valve configured to modulate light emitted from the solid light source, a projection unit configured to project light emitted from the light valve on a projection plane, which is placed on a first placement surface substantially parallel to the projection plane or a second placement surface substantially orthogonal to the first placement surface, wherein
    the housing case has a base plate and a ceiling plate, the base plate facing the second placement face, the ceiling plate being provided on an opposite side to the base plate,
    the ceiling plate is provided with a recessed portion recessed inward of the housing case,
    the recessed portion has an inclined surface inclining downward toward the projection plane, and
    the inclined surface has a transmission area through which light emitted from the projection unit passes, wherein
    side surfaces are provided on respective sides of the recessed portion in a horizontal direction parallel to the projection plane incline toward a center of the recessed portion, and wherein
    the ceiling plate is provided with an enlarged recessed portion having a bottom plane substantially horizontal, and
    the recessed portion is provided in the bottom plane of the enlarged recessed portion.

* * * * *